March 27, 1956
G. A. PHELAN
2,740,085
VOLTAGE REGULATING SYSTEM
Filed July 18, 1952
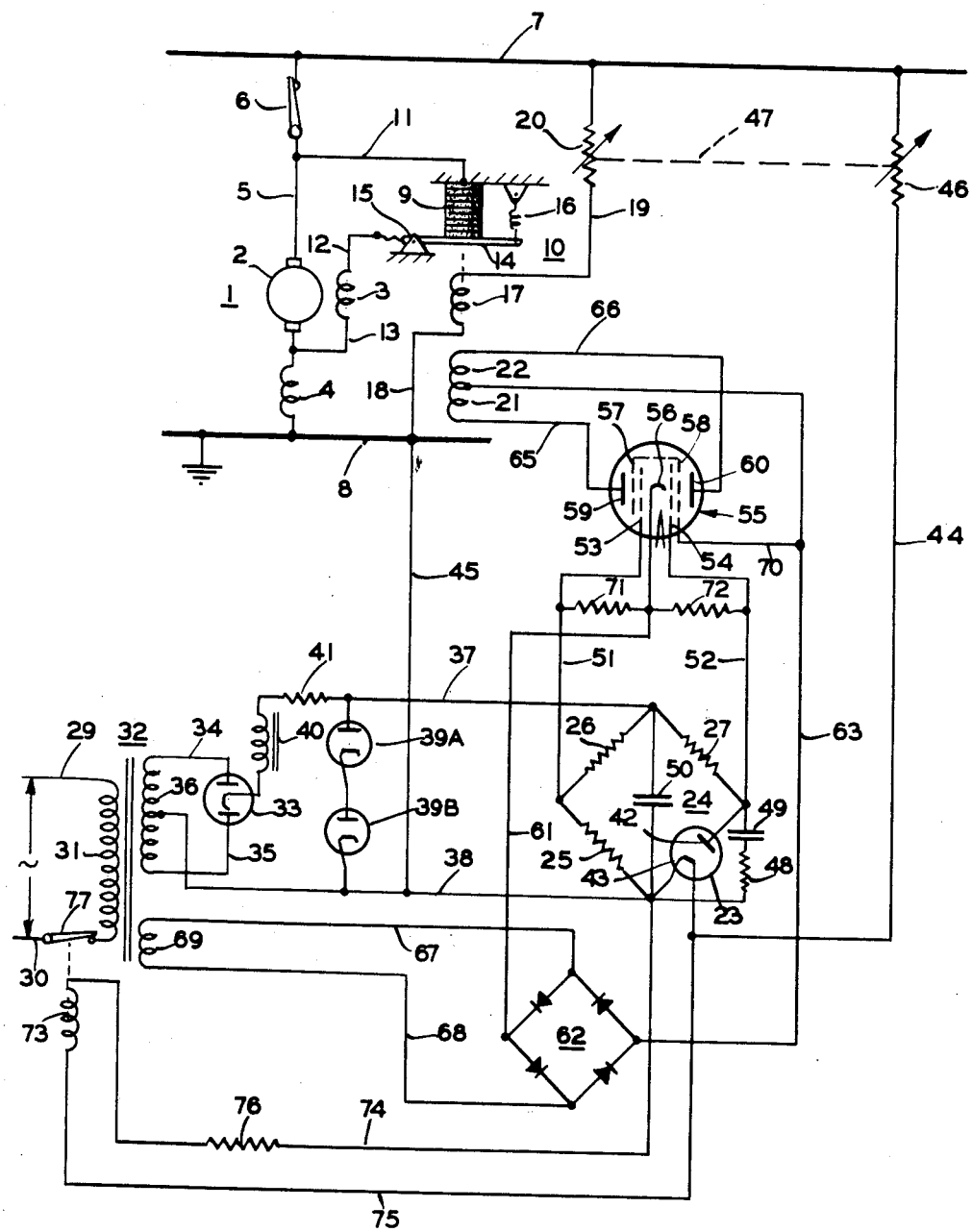
INVENTOR.
GEORGE A. PHELAN
BY
*James M. Mickels*
ATTORNEY

United States Patent Office 2,740,085
Patented Mar. 27, 1956

2,740,085

VOLTAGE REGULATING SYSTEM

George A. Phelan, East Orange, N. J., assignor to Bendix Aviation Corporation, Teterboro, N. J., a corporation of Delaware Application July 18, 1952, Serial No. 299,531

5 Claims. (Cl. 322—28)

The present invention relates to electrical regulating apparatus and more particularly to regulators capable of holding generated voltage with extreme accuracy.

In certain applications, it is necessary to hold generated voltage within narrow predetermined limits over a wide range of generator speeds and varying load conditions. One example is the generating system of an aircraft. The generator is driven by the craft's engines over a wide range of speed and the load varies considerably. The present day aircraft has considerable electrical equipment, some of which require that the voltage be held within narrow limits in order for it to operate satisfactorily.

The present invention provides an electronically trimmed regulator capable of holding generated voltage with extreme accuracy. The voltage to be regulated is sensed by a temperature limited diode which forms one leg of a bridge circuit. The input of the bridge circuit is connected across a source of constant potential D. C. and the output controls the grid of a double beam power amplifier. The outputs of the amplifier are connected to two differentially connected windings of the regulator, adding or subtracting to the ampere turns of the main coil to maintain the voltage at a predetermined value.

An object of the invention is to provide an improved regulator.

Another object of the invention is to provide novel electronic means for regulating the output of a dynamoelectric machine.

Another object of the invention is to provide means for regulating in case of failure of the electronic devices.

The above and other objects and features of the invention will appear more fully hereinafter from a consideration of the following description taken in connection with the accompanying drawing wherein one embodiment of the invention is illustrated by way of example.

In the drawing:

The single figure is a schematic diagram of a generator system embodying the invention.

Referring to the drawing, a generator is indicated generally by the numeral 1 and has an armature 2, shunt field winding 3 and series winding 4. The generator may be driven by any suitable means such as, for example, the engine of an aircraft (not shown). One output terminal of the generator 1 is connected by conductor 5 and switch 6 to output line 7. The other output terminal is connected by the series winding 4 to grounded bus 8.

The shunt field winding 3 is connected in series with a variable resistance element 9, such, for example, as a carbon pile element of a regulator, indicated generally by the numeral 10, across the output of the armature 2 by conductors 11, 12 and 13. The regulator 10 is illustrated diagrammatically as including an armature 14 pivoted at 15 and biased under tension of a spring 16 in a direction tending to decrease the resistance of the pile 9 and thereby increasing the energization of the winding 3 so as to affect an increase in the voltage output of the generator.

A main electromagnet winding 17 biases the armature 14 in a direction opposing the spring 16 and tending to increase the resistance of the pile 9 thereby decreasing the energization of the winding 3 and hence decrease the output voltage of the generator. One end of the winding 17 is connected by conductor 18 to the conductor 8. The other end of the winding 17 is connected by a conductor 19 to the output line 7. A variable resistor 20 may be inserted in the conductor 19 to adjust the voltage setting of the regulator 10.

In order to hold the regulated voltage with extreme accuracy, the present invention provides differentially connected windings 21 and 22 to coact with the main winding 17 of the regulator 10 to add or subtract to the ampere turns of the winding 17.

The energization of the coils 21 and 22 is controlled by a network in accordance with the condition of a temperature limited diode 23 which forms one leg of a bridge circuit 24. The bridge circuit 24 has resistors 25, 26 and 27 for the other legs thereof.

The bridge 24 is energized from a source of alternating current (not shown) which is connected by conductors 29 and 30 to primary winding 31 of a transformer 32. A full wave rectifier 33 is connected by conductors 34 and 35 across secondary winding 36. The output of the rectifier 33 is connected by conductor 37 to one input terminal of the bridge 24. The other input terminal of the bridge 24 is connected by conductor 38 to the midpoint of the winding 36. In order to keep the voltage across the bridge 24 constant, a pair of voltage regulator tubes 39A and 39B are connected across the conductors 37 and 38. An inductance 40 and resistor 41 may be inserted in the conductor 37. The inductance 40 filters the ripple from the rectifier 33 and the resistor 41 limits the current in the tubes 39.

The voltage regulator tubes are of the type that the resistance changes with voltage so that the voltage drop across the tube remains constant. Thus, there is provided a constant voltage for the input of the bridge circuit 24 which is substantially independent of voltage and frequency changes in the alternating current supply.

The temperature limited diode 23 has a plate 42 and a cathode 43. The cathode or filament 43 is connected across the output of the generator 1 by conductors 44 and 45. A variable resistance 46 may be inserted in the conductor 44 to adjust the voltage setting of the regulated voltage. The resistance 44 may be mechanically coupled with the resistance 20 as indicated by the dashed line 47. A resistor 48 and capacitor 49 may be connected across the tube 23 to prevent hunting. A stabilizing capacitor 50 may be connected across the input of the bridge 24.

The output terminals of the bridge 24 are connected by conductors 51 and 52 to respective grids 53 and 54 of a double beam power amplifier tube 55. The tube 55 in addition to the grids 53 and 54 has a cathode 56, screen grids 57 and 58 and plates 59 and 60. The cathode 56 is connected by conductor 61 to the — output terminal of a rectifier 62. The + output terminal of the rectifier 62 is connected by conductor 63 to a common junction point of the windings 21 and 22. The other end of the windings 21 and 22 are connected by conductors 65 and 66 to the respective plates 59 and 60. The input of the rectifier 62 is connected by conductors 67 and 68 across a secondary winding 69 of the transformer 32.

The screen grids 57 and 58 are tied together and connected by conductor 70 to the conductor 63. Grid biasing resistors 71 and 72 are connected between the respective grids 53 and 54 and the cathode 56.

Another feature of the present invention is the provision of means to deenergize the trimming windings 21 and 22 upon failure of the filament 43 so that the unit will operate as a straight carbon pile relay. A relay winding 73 is connected by conductors 74 and 75 across the filament 43. A resistor 76 is inserted in the conductor 74 which together with the resistance of the winding 73 provides a high resistance shunt across the filament 43. Normally, the current will flow in the low resistance filament 43. Upon the filament 43 opening up, the current flowing in the winding 73 will be sufficient to actuate normally closed switch member 77 to an open circuit position thereby deenergizing the transformer 32.

In operation, course regulation is obtained by the winding 17 connected across to output voltage to vary the carbon pile element 9 in accordance with output voltage changes. The windings 21 and 22 are differentially wound and are opposite and equal at the regulated voltage. Upon the voltage departing from the regulated value, the tube 23 will cause the bridge 24 to become unbalanced in a direction depending upon the direction of the deviation. This in turn controls the grids of the double beam power amplifier 55, the outputs of which are connected to the windings 21, 22, adding or substracting to the ampere turns of the winding 17 depending upon the direction of unbalance.

Upon the filament of the tube 23 opening up, the relay 73 will actuate switch member 77 to deenergize the circuit controlling the windings 21, 22, thus shifting the entire control to the winding 17.

While a double beam power amplifier tube has been illustrated, it is understood that two separate tubes could be used.

The source of A. C. voltage used in the aforenoted system may vary as to frequency and voltage over wide limits, yet the system will hold the regulated voltage at its predetermined value.

Although only one embodiment of the invention has been illustrated and described, various changes in the form and relative arrangement of the parts, which will now appear to those skilled in the art, may be made without departing from the scope of the invention.

I claim:

1. A voltage regulator for use in a direct current generator having a field winding and an output circuit, comprising a variable resistance device for controlling the energization of said field winding, a main control winding and a pair of differentially wound trimmer windings for said variable resistance device, said main winding being connected across the output of said generator to provide a course control, a normally balanced bridge circuit for energizing said trimmer windings, a source of reference voltage for said bridge circuit, means including an electronic discharge device in one leg of said bridge circuit and responsive to variations in said output circuit to unbalance said bridge circuit and effect said trimmer windings in accordance with said variations and relay means for disabling said bridge circuit upon a failure of said electron discharge device.

2. The combination as set forth in claim 1 and including stabilizing means connected across said electron discharge device.

3. A regulator for use with a direct current generator, comprising a variable resistance element for controlling the output of the generator, electromagnetic means for adjusting said element and including an armature, a main winding and a pair of auxiliary compensating windings differentially wound to be opposing, said main winding being responsive to the output voltage of said generator, a normally balanced bridge circuit, a source of substantially constant direct current for energizing said bridge circuit, means including a temperature limited diode in one leg of said bridge circuit and responsive to the output voltage of said generator to affect said circuit in accordance with variations in said output voltage, an output circuit including amplifier means for energizing said auxiliary windings and means for deenergizing said bridge circuit upon the filament of said diode becoming open.

4. A regulator for use with a direct current generator, comprising a variable resistance element for regulating said generator, a main winding and a pair of auxiliary windings for controlling said element, circuit means connecting said main winding across the output of said generator, a bridge circuit having a temperature limited diode in one leg thereof, a source of constant potential for energizing said bridge circuit, circuit means including amplifier means connecting said auxiliary windings in series opposing across the output of said bridge circuit, means for energizing the filament of said diode in accordance with a condition of the output of said generator to affect said bridge circuit in accordance with changes in said condition and a relay connected in shunt with said filament to deenergize said bridge circuit upon said filament becoming open.

5. The combination as described in claim 4 and including an impedance network connected across said diode to prevent fluctuations therein.

References Cited in the file of this patent

UNITED STATES PATENTS

| | | |
|---|---|---|
| 1,333,662 | Kajenmaier | Mar. 16, 1920 |
| 2,008,855 | Drobish | July 23, 1935 |
| 2,611,121 | Emerson | Sept. 16, 1952 |